United States Patent [19]

Yokoyama

[11] Patent Number: 5,694,226
[45] Date of Patent: Dec. 2, 1997

[54] FACSIMILE APPARATUS

[75] Inventor: Shizuo Yokoyama, Kanagawa, Japan

[73] Assignee: Ricoh Company, Ltd., Tokyo, Japan

[21] Appl. No.: 492,615

[22] Filed: Jun. 20, 1995

[30] Foreign Application Priority Data

Jun. 20, 1994 [JP] Japan .................................. 6-159634

[51] Int. Cl.$^6$ .............................. H04N 1/00; H04N 1/41; H04N 1/46
[52] U.S. Cl. ...................... 358/468; 358/400; 358/404; 358/413; 358/409; 358/503; 358/296; 399/69; 399/51; 399/70; 219/216
[58] Field of Search ................... 358/296, 400, 358/422, 434, 436, 403, 468, 502, 503; 355/208, 285, 289, 290; 219/216; 399/69, 51, 70; 347/102, 171

[56] References Cited

U.S. PATENT DOCUMENTS

| | | | |
|---|---|---|---|
| 4,907,094 | 3/1990 | Mishima | 358/436 |
| 5,068,675 | 11/1991 | Momose | 358/286 |
| 5,177,620 | 1/1993 | Fukushima | 358/404 |
| 5,315,350 | 5/1994 | Hirobe | 355/208 |
| 5,483,353 | 1/1996 | Kudou | 358/404 |
| 5,521,686 | 5/1996 | Muto | 355/285 |

Primary Examiner—Edward L. Coles, Sr.
Assistant Examiner—Mark Wallerson
Attorney, Agent, or Firm—Oblon, Spivak, McClelland, Maier & Neustadt, P.C.

[57] ABSTRACT

A facsimile apparatus which includes a heater for fixing an image on a recording member and a heater control unit for controlling the heater. A timer is provided for outputting a time and a time range register registers a heater-on time range. A heater-on managing unit controls the heater control unit so that the heater is at a preheat temperature level within the heater-on time range, and so that the heater is at an image fixing temperature level when an image signal is received. Further, a heater-off managing unit controls the heater control unit so that the heater is at the image fixing temperature level out of the heater-on time range when the image signal is received. The heater-on managing unit can also shift a beginning time of the heater-on time range from a registered time to a time of a receipt of the image signal, so to extend the ending time of the heater-on time range when the image signal is received within the heater-on time range. The heater-on managing unit can also stop control of the heater control unit after the heater-on time range is over when the image signal is not received within the heater-on time range.

5 Claims, 6 Drawing Sheets

FACSIMILE APPARATUS

BACKGROUND OF THE INVENTION

1. Field of the Invention

The present invention relates to a facsimile apparatus used in an electrophotographic method. More particularly, the present invention is directed to a heater of the facsimile apparatus for fixing an image on a recording member, and control of the heater.

2. Discussion of the Background

In a facsimile apparatus for fixing an image on a recording member with heat, a heater is maintained at a pre-heat temperature level so as to reduce electric consumption. When an image signal is received and an image is outputted on the recording member, the heater heats up to an image fixing temperature level by supplying electric power to the heater in a short time.

Such a conventional system, however, suffers from a drawback in that even though the heater is maintained at the pre-heat level, the facsimile apparatus consumes a large amount of electricity.

In conventional systems, when an image signal is not frequently received, such as during the night-time or on a holiday, the heater is off. If an image signal is received at this time, an image is not outputted on the recording member, and the image is stored in a memory in the facsimile apparatus.

This kind of facsimile apparatus is disclosed in Japan laid-open No. 4-264870, 5-30315, 2-118674, 5-327964, 3-221984. However, when an image signal is not frequently received, it may be necessary that a content of the received image signal should be confirmed. In this situation, it is desired that the image is immediately outputted on the recording member when the heat remains off.

SUMMARY OF THE INVENTION

Accordingly, it is an object of the present invention to provide a novel facsimile apparatus which is capable of outputting an image signal on a recording member immediately when an image signal is received, even if the image signal is received out of a heater-on time range, so as to improve an operation of a facsimile apparatus.

In order to achieve the above-mentioned objects, according to the present invention, there is provided a facsimile apparatus which includes a heater for fixing an image on a recording member and a heater control unit for controlling the heater. A timer is also provided for outputting a time, and a time range register registers a heater-on time range. A heater-on managing unit controls the heater control unit so that the heater is at a pre-heat temperature level within the heater-on time range, and so that the heater is at an image fixing temperature level when an image signal is received. Further, a heater-off managing unit controls the heater control unit so that the heater is at the image fixing temperature level out of the heater-on time range when the image signal is received.

As a further feature of the present invention, a heater-on managing unit can control the heater control unit so that the heater is at the pre-heat temperature level within the heater-on time range, and so that the heater is at an image fixing temperature level when an image signal is received. The heater-on managing unit can then shift a beginning time of the heater-on time range from a registered time to a time of a receipt of the image signal, so to extend the ending time of the heater-on time range when the image signal is received within the heater-on time range. The heater-on managing unit can also stop control of the heater control unit after the heater-on time range is over when the image signal is not received within the heater-on time range.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
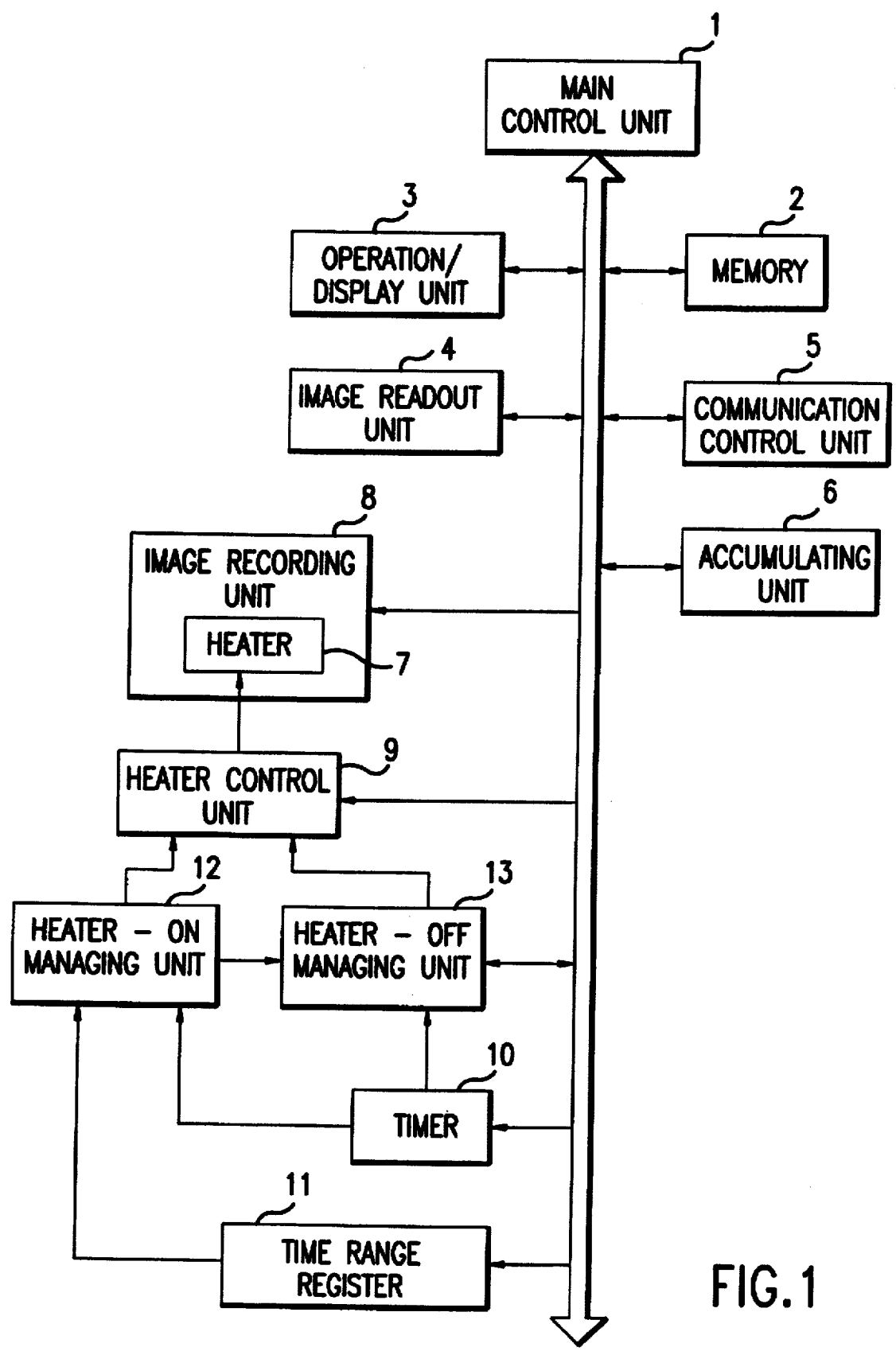
FIG. 1 is a block diagram showing first, second, and third embodiments according to the present invention.

Referring now to the drawings, wherein like reference numerals designate identical or corresponding parts throughout the several views, and more particularly to FIG. 1 thereof, there is a block diagram showing first, second, and third embodiments of the present invention.

In FIG. 1, a facsimile apparatus has a main control unit 1 for controlling a whole operation of the facsimile apparatus, a memory 2 for storing control programs and information, an operation/display unit 3 for displaying a state of operation or performing operations such as inputting a sender's telephone number, an image readout unit 4 for reading out sending documents, a communication control unit 5 for controlling communications on lines, an accumulating unit 6 for accumulating sending or received image signals, an image recording unit 8 having a heater 7 for fixing an image on a recording member (e.g. a paper sheet), a heater control unit 9, a timer 10 (e.g. clock) for outputting a time, a time range register 11, a heater-on managing unit 12, and a heater-off managing unit 13. A heater-on time range, i.e. a time when the heater 7 is on, is registered in the time range register 11. The heater-on managing unit 12 confirms a time outputted from the timer 10 and controls the heater control unit 9 such that the heater 7 is on within the heater-on time range. The heater control unit 9 controls electricity for the heater 7. The heater-off managing unit 13 outputs received image signals from the image recording unit 8 to the recording member, when an image signal is received out of the registered heater-on time range.

Figure 2:
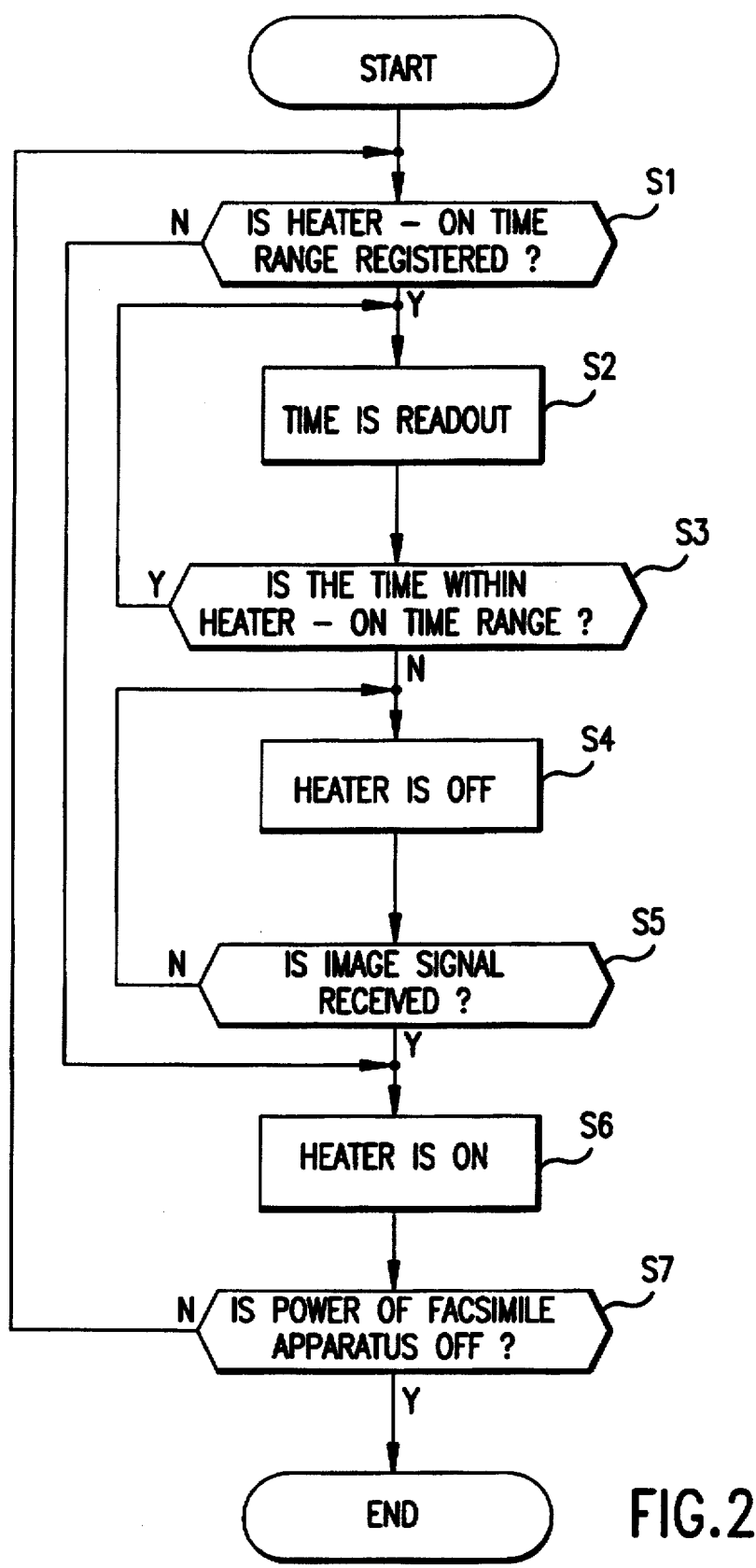
FIG. 2 is a flow chart showing an operation of the first embodiment of the present invention.

An operation of the facsimile apparatus is explained hereinafter with reference to FIG. 2. FIG. 2 is a flow chart showing an operation of the first embodiment of the present invention.

In step S1, the heater-on managing unit 12 confirms that the heater-on time range is registered in the time range register 11; the heater-on time range may typically be such as from 8:00 AM to 8:00 PM. In step S2, a time outputted from the timer 10 is read out.

In step S3, the time is checked to determine if the time is within the heater-on time range or if the time is out of the heater-on time range. If YES in step S3, i.e. if the time is within the heater-on time range, then the heater-on managing unit 12 outputs a command to the heater control unit 9 to turn on the heater 7 when the time reaches the beginning of the heater-on time range, e.g. 8:00 AM in the example noted above.

The heater control unit 9 controls electricity for the heater 7 so that the heater 7 is at the preheat temperature level within the heater-on time range. The heater-on managing unit 12 controls the heater control unit 9 so that the heater 7 is at an image fixing temperature level when the image signal is received within the heater-on time range. The heater-on managing unit 12 outputs received image signals from the image recording unit 8 to the recording member. When the output of the image signal from the image recording unit 8 is completed, the heater control unit 9 controls the electricity supply for heater 7 so that the heater 7 is at the preheat temperature level again.

If NO in step S3, then in step S4, when the heater-on managing unit 12 confirms that the time is at an end of the heater-on time range, e.g. 8:00 PM in the example noted above, then the heater control unit 9 stops controlling electricity for the heater 7 so as to cut off electricity for the heater 7. The heater-off managing unit 13 confirms that the time is out of the heater-on time range.

In step S5, it is determined if an image signal is received out of the heater-on time range.

In step S6, the heater-off managing unit 13 controls the heater control unit 9 so that the heater 7 is at the image fixing temperature level. The heater-off managing unit 13 outputs the received image signals from the image recording unit 8 to the recording member.

In step S7, when the output of the image signal from the image recording unit 8 is completed, the heater control unit 9 stops controlling electricity for the heater 7. The above-mentioned process is performed repeatedly while the power of the facsimile apparatus is on.

The heater 7 in the image recording unit 8 is on when image signals are frequently received. The heater 7 in the image recording unit 8 is off when image signals are not frequently received. In this way, electric consumption for heater 7 in the image recording unit 8 is reduced.

The heater-off managing unit 13 controls the heater control unit 9 so that the heater 7 is at the image fixing temperature level when an image signal is received out of the heater-on time range, and immediately outputs the received image signal to the recording unit 8. A facsimile operator can then easily confirm a receipt of the image signal and a content of the image signal.

Figure 3:
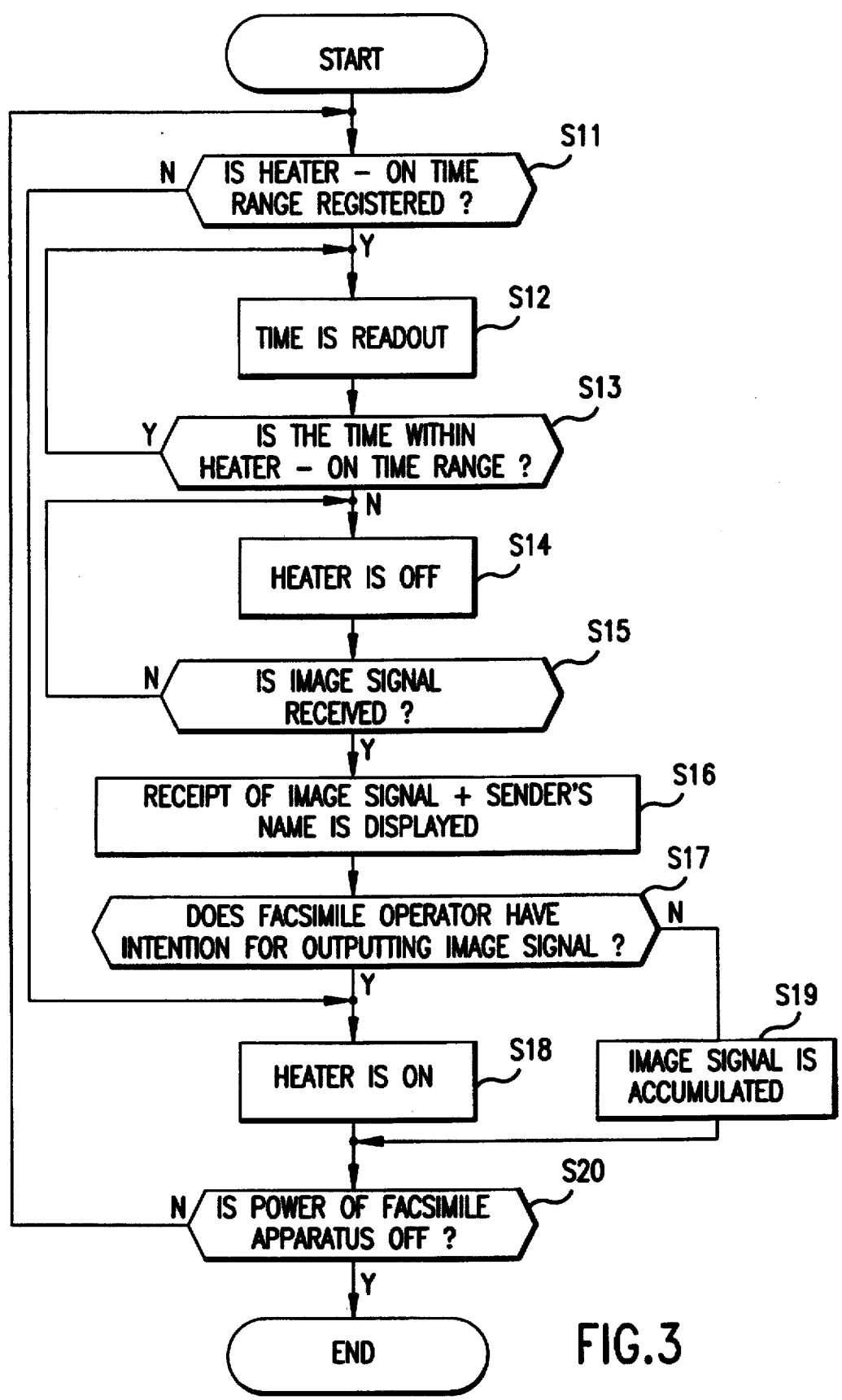
FIG. 3 is a flow chart showing an operation of the second embodiment of the present invention.

A second embodiment of the present invention is explained hereinafter with reference to FIG. 3. FIG. 3 is a flow chart showing an operation of the second embodiment.

In the second embodiment, the heater-off managing unit 13 controls the heater control unit 9 so that the heater 7 is at the image fixing temperature level when an image signal is received out of the heater-on time range, and only outputs received image signals to the recording member in accordance with a facsimile operator's intention for outputting the image signals.

Step S11, step S12, and step S13 are the same as step S1, step S2, and step S3 of FIG. 2, respectively, and their detailed explanation is omitted.

In step S14, the heater-off managing unit 13 controls the heater control unit 9 which stops controlling the supply of electricity for the heater 7 so as to cut off electricity for the heater 7.

In step S15, it is determined if an image signal is received out of the heater-on time range. In step S16, the receipt of the image signal and an image signal sender's name are displayed in the operation/display unit 3.

In step S17 and step S18, the facsimile operator confirms the receipt of the image signal and the image signal sender's name on the operation/display unit 3.

When the facsimile operator has an intention for outputting an image signal, the heater-off managing unit 13 controls the heater control unit 9 so that the heater 7 is at the image fixing temperature level when an image signal is received out of the heater-on time range and outputs the received image signal to the recording unit 8.

In step S19, when the facsimile operator has no intention for outputting the image signal, the received image signal is accumulated in the accumulating unit 6. Then, when the time of the beginning of the heater-on time range arrives, the image signals accumulated in the accumulating unit 6 are outputted to the recording unit 8.

Figure 4:
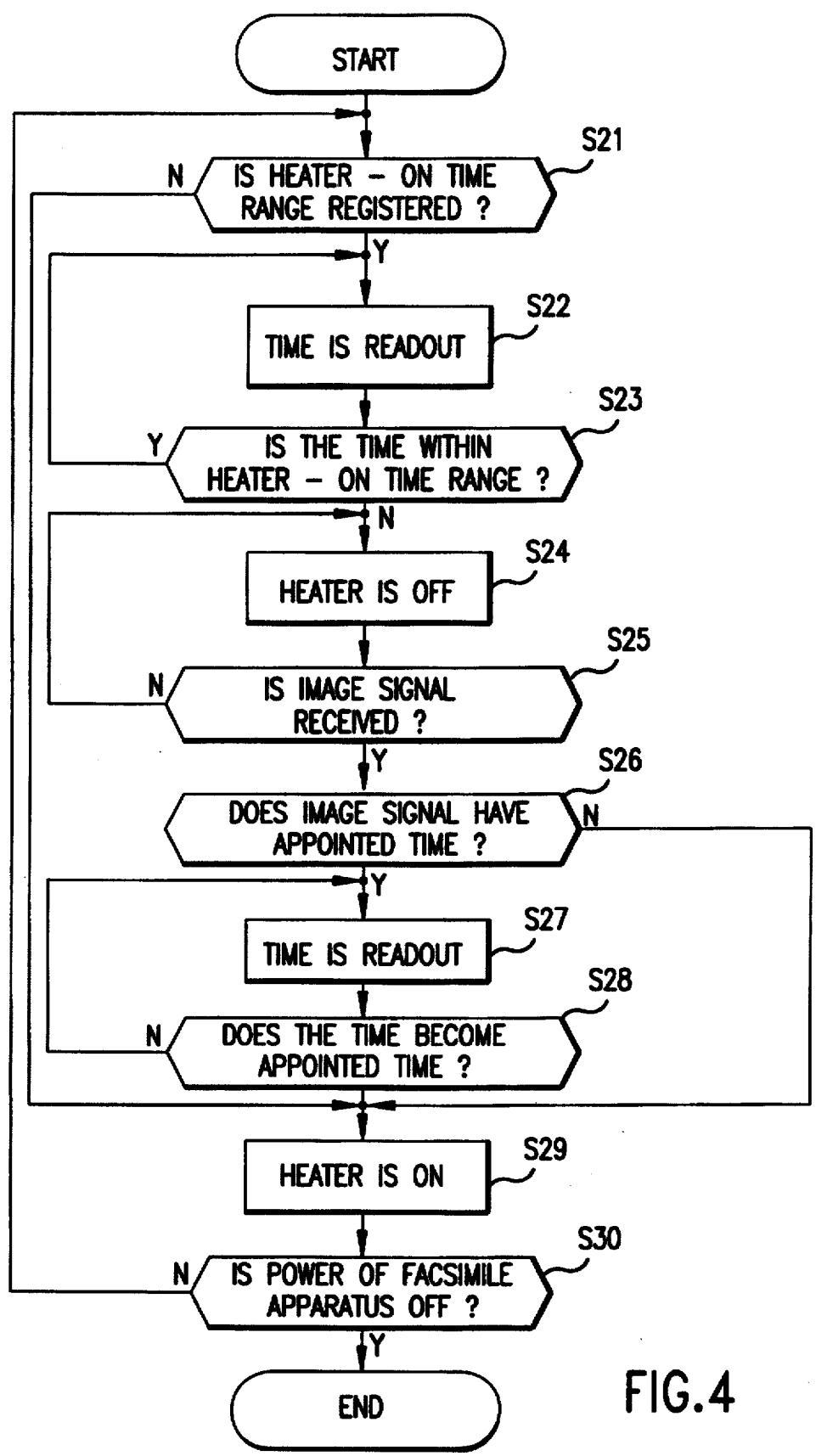
FIG. 4 is a flow chart showing an operation of the third embodiment of the present invention.

A third embodiment of the present invention is explained hereinafter with reference to FIG. 4. FIG. 4 is a flow chart showing an operation of the third embodiment.

In the third embodiment, step S21, step S22, step S23, and step S24 are the same as step S1, step S2, step S3, and step S4 of FIG. 1, respectively, and their detailed explanation is omitted.

In step S25, it is determined if an image signal is received out of the heater-on time range. In step S26, it is determined if the image signal has an appointed time for image output, and the main control unit 1 sends the information of the appointed time to the heater-off managing unit 13. The existence of the appointed time is checked during a protocol procedure for the facsimile apparatus at the time of receiving or sending an image signal.

In step S27, the heater-off managing unit 13 reads out the time outputted from the timer 10. In step S28, the read out time becomes the appointed time. In step S29, the heater-off managing unit 13 controls the heater control unit 9 so that the heater 7 is at the image fixing temperature level and the received image signal is output to the recording unit 8.

When an image signal which is received out of the heater-on time range has no appointed time for an image output, the heater-off managing unit 13 controls the heater control unit 9 so that the heater 7 is at the image fixing temperature level and the received image signal is output to the recording unit 8 immediately.

Figure 5:
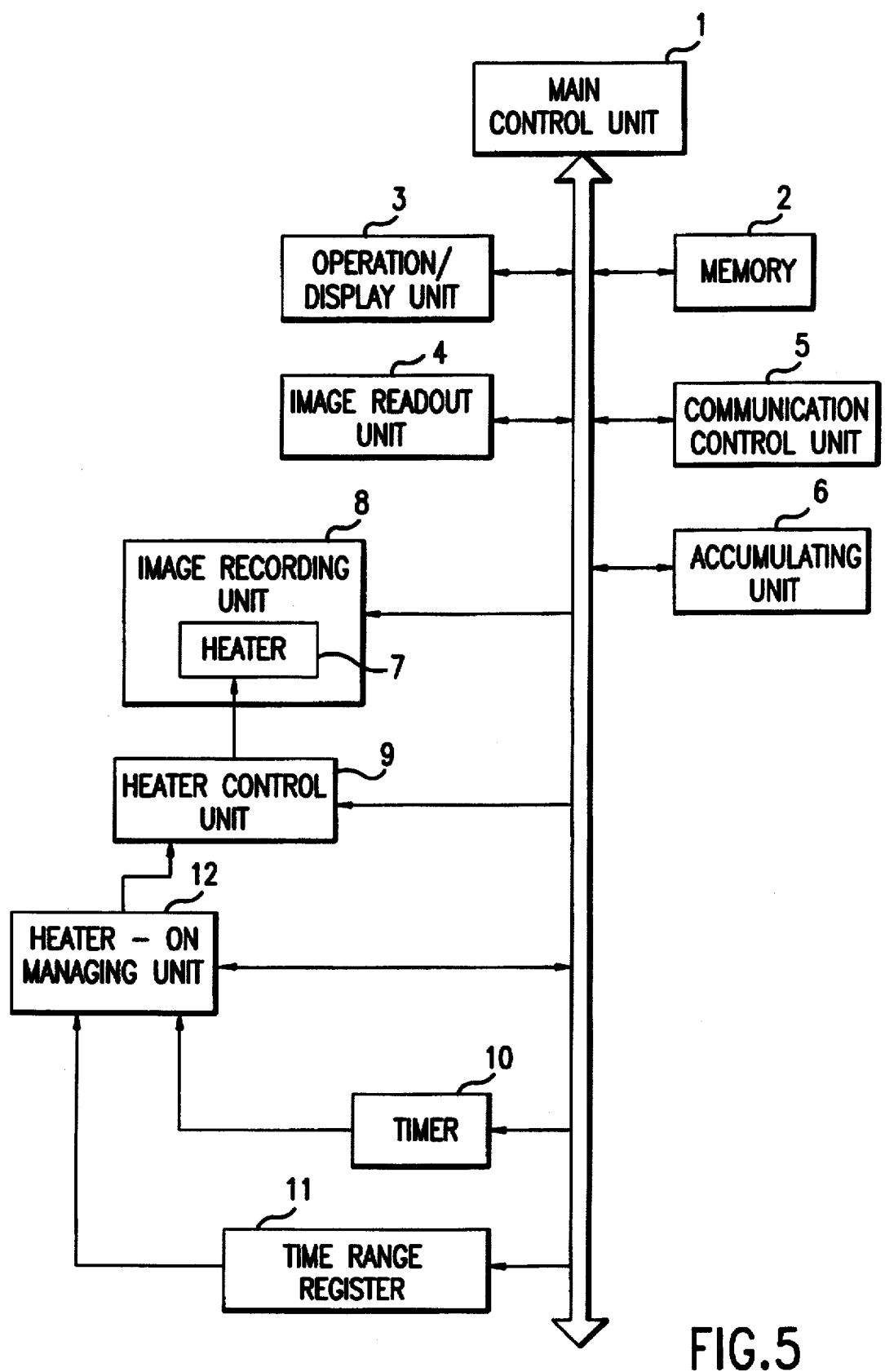
FIG. 5 is a block diagram showing a fourth embodiment of the present invention.

A fourth embodiment of the present invention is explained hereinafter with reference to FIG. 5. FIG. 5 is a block diagram showing the fourth embodiment.

The same members in FIG. 5 have the same reference numerals in FIG. 1, and their detailed explanation is omitted here.

In FIG. 5, the heater-on time range is registered in the time range register 11, such as from 8:00 AM to 9:00 AM (one hour).

The heater-on managing unit 12 controls the heater control unit 9 so that the heater 7 is at the image fixing temperature level when a first image signal is received within the heater-on time range, e.g. at 8:10 AM. The heater-on managing unit 12 controls the heater control unit 9 so that the heater 7 is at the image fixing temperature level when a second image signal is received within the heater-on time range, e.g. at 8:30 AM, and this also shifts the beginning time of the heater-on time range (e.g. 8:00 AM) to a time of receipt of the second image signal (e.g. 8:30 AM), so as to extend the ending time of the heater-on time range (e.g. 9:00 AM→9:30 AM).

The heater-on managing unit 12 stops control of the heater control unit 9 after the heater-on time range is over when a second image is not received within the heater-on time range.

Figure 6:
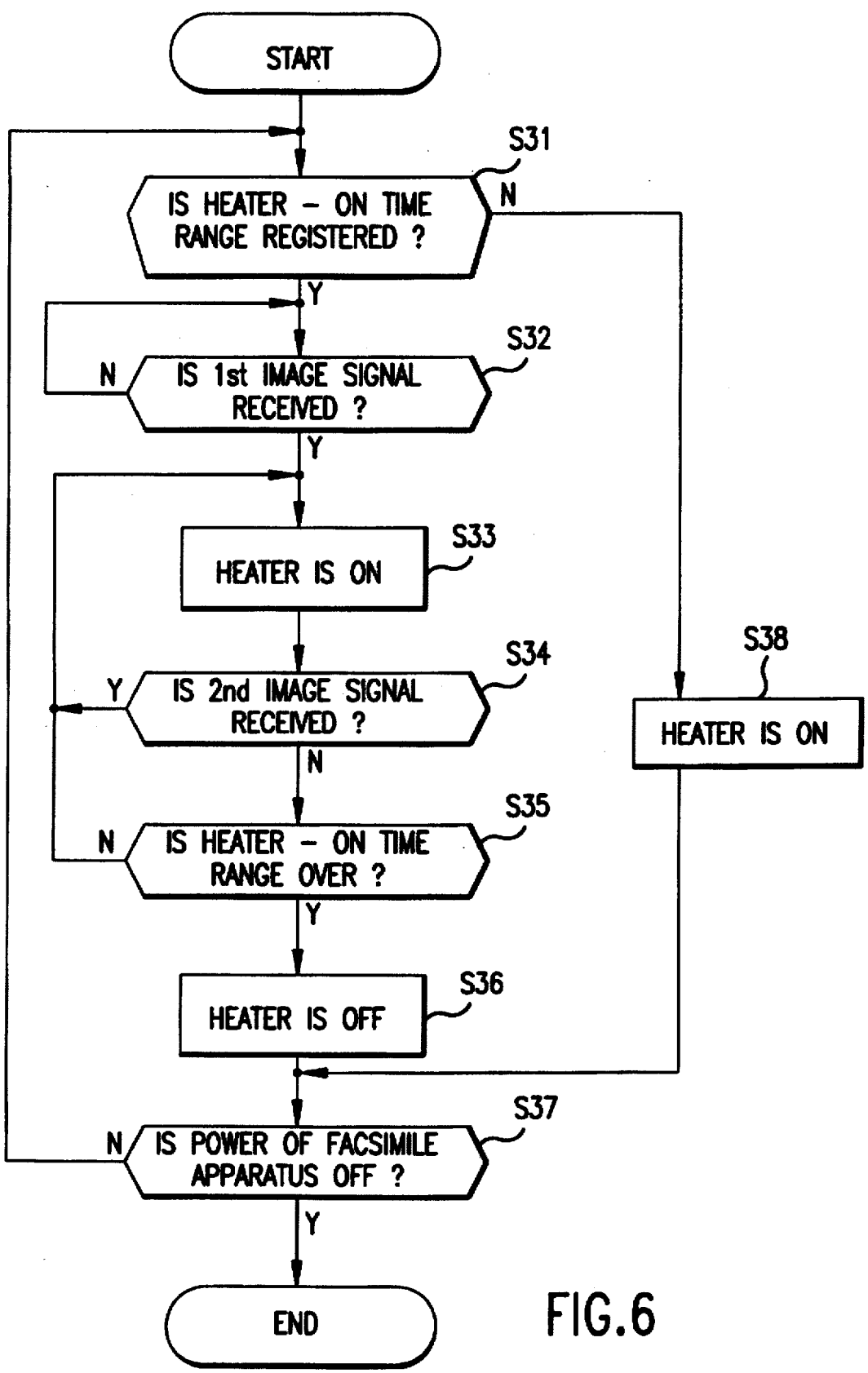
FIG. 6 is a flow chart showing an operation of the fourth embodiment of the present invention.

An operation of the facsimile apparatus of FIG. 5 is explained hereinafter with reference to FIG. 6. FIG. 6 is a flow chart showing an operation of a fourth embodiment of the present invention.

In step S31, step S32, and step S33, the heater-on time range is registered in the time range register 11, such as from 8:00 AM to 9:00 AM (one hour).

When a first image signal is received within the heater-on time range, e.g. at 8:10 AM, the heater-on managing unit 12 controls the heater control unit 9 so that the heater 7 is at the image fixing temperature level and the received first image signal is outputted from the image recording unit 8 to the recording member.

In step S34, when second image signal is received within the heater-on time range, e.g. at 8:30 AM, the heater-on managing unit 12 controls the heater control unit 9 so that the heater is at the image fixing temperature level, and shifts the beginning time of the heater-on time range (e.g. 8:00 AM) to a time of receipt of the second image signal (e.g. 8:30 AM), so as to extend the ending time of the heater-on time range (e.g. 9:00 AM→9:30 AM).

The received second image signal is then outputted from the image recording unit 8 to the recording member.

In step S35, and step S36, when the second image signal is not received within the heater-on time range (8:00 AM to 9:00 AM), the heater-on managing unit 12 stops the operation of the heater control unit 9. The heater 7 in the image recording unit 8 is then off.

In step S37, the above-mentioned process is performed repeatedly while the power of the facsimile apparatus is on.

In step S38, when the heater-on time range is not registered in the time range register 11, the heater-on managing unit 12 controls the heater control unit 9 so that the heater 7 is at an image fixing temperature level at the receipt of the image signal. The received image signal is outputted from the image recording unit 8 the recording member. The heater 7 in the image recording unit 8 is on when image signals are frequently received. The heater 7 in the image recording unit 8 is off when image signals are not frequently received. Electric consumption for heater 7 in the image recording unit 8 is thus reduced.

In the above-mentioned step S34, when the second signal is received, the heater-on managing unit 12 shifts the beginning time of the heater-on time range to a time of receipt of the second image signal. Also, as a modification of the fourth embodiment, when the first signal is received at, e.g., 8:10 AM, the heater-on managing unit 12 shifts the beginning time of the heater-on time range (e.g. 8:00 AM) to a time at receipt of the first image signal (e.g. 8:10 AM) so as to extend the ending time of the heater-on time range (e.g. 9:00 AM→9:10 AM).

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A facsimile apparatus comprising:
    a heater for fixing an image on a recording member;
    a heater control unit for controlling the heater;
    a timer for outputting a time;
    a time range register for registering a heater-on time range;
    a heater-on managing unit for controlling said heater control unit so that said heater is at a preheat temperature level within said heater-on time range, and so that said heater is at an image fixing temperature level when an image signal is received; and
    a heater-off managing unit for controlling said heater control unit to be at the image fixing temperature level when the image signal is received at a time out of said heater-on time range;
    wherein said heater-off managing unit displays a receipt of the image signal on a displaying unit when the image signal is received out of said heater-on time range, and said heater-off managing unit controls said heater control unit so that said heater is at the image fixing temperature level only when an image output command from an operation is generated.

2. The facsimile apparatus according to claim 1, wherein said heater-off managing unit controls said heater control unit at an appointed time so that said heater is at the image fixing temperature level, if the image signal has said appointed time for image output, when the image signal is received out of said heater-on time range.

3. A facsimile apparatus comprising:
    heating means for fixing an image on a recording member;
    heater control means for controlling the heater means;
    timer means for outputting a time;
    time range register means for registering a heater-on time range;
    heater-on managing means for controlling said heater control means so that said heater means is at a preheat temperature level within said heater-on time range, and so that said heater means is at an image fixing temperature level when an image signal is received; and
    a heater-off managing means for controlling said heater control means to be at the image fixing temperature level when the image signal is received at a time out of said heater-on time range;
    wherein said heater-off managing means displays a receipt of the image on a display means when the image signal is received out of said heater-on time range, and said heater-off managing means controls said heater control means so that said heater means is at the image fixing temperature level only when an image output command from an operator is generated.

4. The facsimile apparatus according to claim 3, wherein said heater-off managing means controls said heater control means at an appointed time so that said heater means is at the image fixing temperature level, if the image signal has said appointed time for image output, when the image signal is received out of said heater-on time range.

5. A facsimile apparatus comprising:
    a heater for fixing an image on a recording member;
    a heater control unit for controlling the heater;
    a timer for outputting a time;
    a time range register for registering a heater-on time range; and a heater-on managing unit for controlling said heater control unit so that said heater is at a preheat temperature level within said heater-on time range, and so that said heater is at an image fixing temperature level when an image signal is received, and for automatically shifting at least one of a beginning time and an ending time of said heater-on time range from a registered time to a time based on a receipt of the image signal, so as to extend an ending time of said heater-on time range when the image signal is received within said heater-on time range, and for stopping control of said heater control unit after said heater-on time range is over when the image signal is not received within said heater-on time range.

* * * * *